(12) United States Patent
    Cartagena

(10) Patent No.: US 7,901,638 B2
(45) Date of Patent: Mar. 8, 2011

(54) OXIDIZING REACTOR FOR MOLYBDENUM SULPHIDE AND ITS ASSOCIATED PROCESS

(76) Inventor: Gustavo Cartagena, Santiago (CL)

( * ) Notice: Subject to any disclaimer, the term of this patent is extended or adjusted under 35 U.S.C. 154(b) by 295 days.

(21) Appl. No.: 12/119,752

(22) Filed: May 13, 2008

(65) Prior Publication Data
    US 2008/0299025 A1   Dec. 4, 2008

(30) Foreign Application Priority Data
    May 28, 2007  (CL) .................................. 1520-2007

(51) Int. Cl.
    *B01J 19/08*   (2006.01)
(52) U.S. Cl. .................................. 422/186.01
(58) Field of Classification Search .............. 422/186.01
    See application file for complete search history.

(56) References Cited

U.S. PATENT DOCUMENTS
4,523,948 A   6/1985   McHugh et al.

FOREIGN PATENT DOCUMENTS
CL            39672        8/1996

*Primary Examiner* — Kishor Mayekar
(74) *Attorney, Agent, or Firm* — McGarry Bair PC

(57) ABSTRACT

A reactor for molybdenum sulphide (MoS2), wherein MoS2 is ionized by an electric field generated by a first set of magnetrons at a frequency in the range of 2500-3500 MHz and heated by a variable magnetic field of 2500 Hz produced by a winding coil, resulting in the exclusive evaporation of molybdenite. MoS2 in gas state is then stimulated by a second set of magnetrons and, with the injection of air, oxidized until trioxide is obtained. Hot gases essentially containing molybdenum trioxide, sulphur dioxide, and nitrogen are conducted from a first body towards a second body though a first duct. Cold air is added to the second body through a second duct to cool the gas, and crystals formed by liquefaction settle and are removed through a lower duct while gases at a temperature of 600° C. are conducted through a higher duct.

7 Claims, 3 Drawing Sheets

US 7,901,638 B2

OXIDIZING REACTOR FOR MOLYBDENUM SULPHIDE AND ITS ASSOCIATED PROCESS

CROSS-REFERENCE TO RELATED APPLICATION

This application claims the benefit of Chilean Application No. 1520-2007 filed May 28, 2007 and incorporated by reference in its entirety.

FIELD OF THE INVENTION

The invention relates to a reactor and a process for the conversion of molybdenite to molybdenum trioxide.

BACKGROUND OF THE DISCLOSURE

In the metallurgical industry of steel and special alloys approximately 90% of molybdenum is used while in the chemical industry and its associated products the amount used is 10%.

Molybdenum is obtained as a by-product of the metallurgical process of copper through selective flotation where it is produced as a natural composite of molybdenum sulphide referred to as molybdenite ($MoS_2$). However, it is required to be in high purity oxide or metal state as to be further used in the steel industry, mainly.

The metal is used as a ferrous-molybdenum alloy while the oxide used in a direct manner is molybdenum trioxide.

The trioxide is currently produced by oxidizing roast of molybdenite in a cell roasting furnace producing material of the same type and level of impurities than the original concentrate fed into the furnace therein.

The document U.S. Pat. No. 4,523,948 (McHugh et al.) dated Jun. 18, 1985 discloses a method for treatment of molybdenum concentrate in a two-zone roasting furnace in a vertical equipment of twelve (12) stages or levels until molybdenum trioxide is produced in the lower level. The resulting trioxide has the same type and level of impurities that the concentrate originally fed. The method requires a prior or further cleaning process as to remove the rest of the elements. $SO_2$ produced in gases presents a very low concentration for conversion purposes in conventional plants.

Document dock reference CL 39762 (Lusarenko el al.) discloses a procedure for trioxide production by means of microwaves. The document proposes a disc subject to microwaves in order to produce pure trioxide as a more efficient alternative in the different levels of a multi-level roasting furnace. The patent exists but it has a reduced domain without applications.

SUMMARY

The invention is a stand-alone unit with regards to the multi-level roasting furnace, separates impurities, and produces an appropriate $SO_2$ concentration. Application of the invention allows achieving a product of high purity and gas with $SO_2$ concentration which is appropriate for mitigation and conversion plants to conventional sulphuric acid.

The conversion process of molybdenite to molybdenum trioxide in the invention herein relies on three properties of molybdenum composites, thus the process is divided in three stages. The first property is the semi-conductive property molybdenum sulphide gains in an axis when stimulated with a high frequency electric field; the second is the sublimation of molybdenum sulphide, and the third property is sublimation of molybdenum trioxide.

The stages of the process are the following:

First: In this stage of molybdenite sublimation which leverages the first property, variable magnetic and electric fields are used to heat and volatilize at low temperature by using the second property.

Second: In this stage of conversion into molybdenum trioxide, molybdenum sulphide is spontaneously oxidized using a controlled flow of air or oxygen-enriched air under a high frequency electric field, based on the third property as to keep the trioxide in gas state and impurities as solids.

Third: In this stage of separation of trioxide from molybdenum, the third property is still in use but through a decrease in temperature molybdenum trioxide condensation is reached as a solid in crystals.

In the first stage of the process, molybdenum concentrate is subject to magnetic and electric fields in order to gain a controlled increase in temperature to a maximum of 350° C., as molybdenum sulphide at such temperature is in gas state and should there be any remaining amount of arsenic sulphide it will also be in gas state.

In the second stage, gas products resulting from the first stage are subject to an electric field in the presence of oxygen as to oxidize sulphides, thus producing molybdenum trioxide ($MoO3$), arsenious oxide ($AS2O3$), and sulphide dioxide ($SO2$). Temperature at this stage should be kept in a range of 800-850° C.

Both the first and the second stages of the process are carried out in the first body 5 of the reactor illustrated in FIG. 3.

Finally, in the third stage the molybdenum trioxide is selectively separated by condensation thus slightly decreasing gas temperature by means of injection of fresh air, hence the rest of the components are kept in a gas state. The third stage of the process is carried out in the second body 11 of the reactor illustrated in FIG. 3.

BRIEF DESCRIPTION OF THE DRAWINGS

The drawings, which are included as to provide greater understanding of the invention, are herein incorporated and are integral part of the description and illustrate one embodiment of the invention, and along with the description, facilitate the explanation of the principles of the invention.

DESCRIPTION OF THE INVENTION

Figure 1:
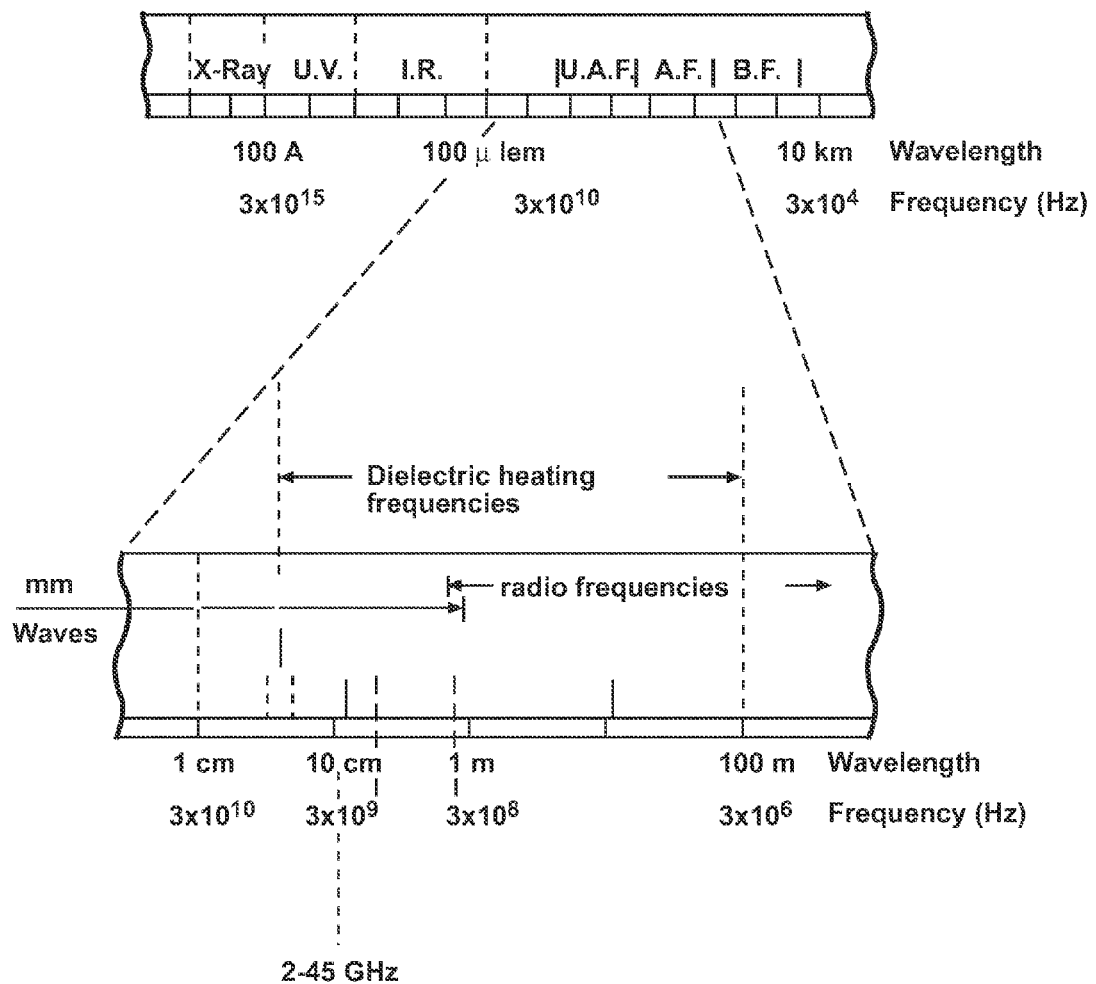
FIG. 1 shows a graphic view of the electromagnetic spectrum and the definition of frequencies used in the methodology of the present invention and illustrates a study of microwave irradiation on different types of concentrates.

Now in reference to FIG. 1, the graphic showing the electromagnetic spectrum and the definition of frequencies used in this methodology, it should be observed the frequency range used ranges from 2000 MHertz-3000 MHertz, wherein molybdenite, whether is type "p" or "n," presents greater conductivity along one of the axis thus showing greater warming and distortion of the two terminals by the action of the variable electric fields applied.

Figure 2:
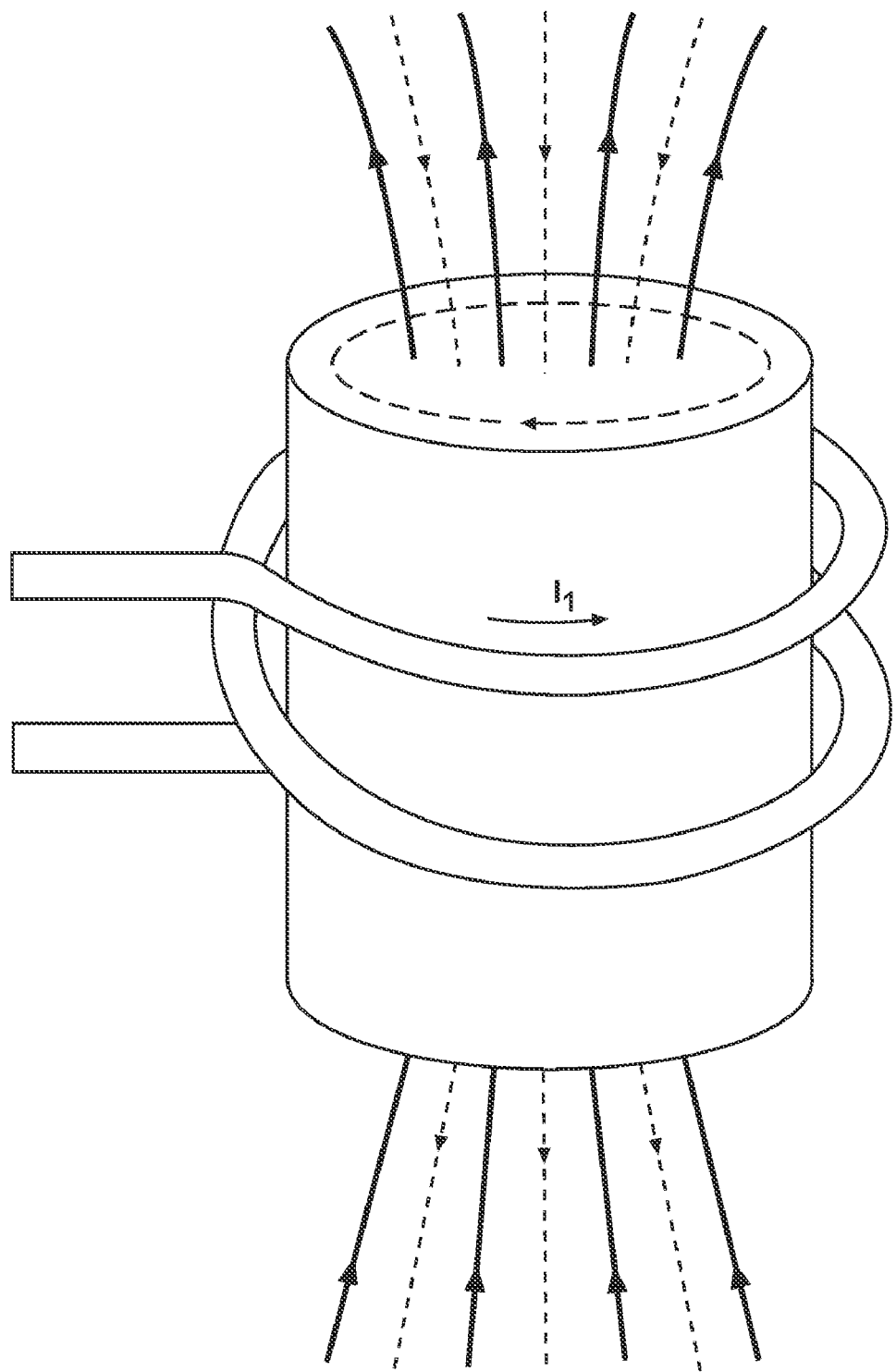
FIG. 2 shows a graphic image of heating by low frequency electromagnetic induction through the pass of a current through the winding coil of a conductor.

FIG. 2 shows a graphic image of heating by low frequency electromagnetic induction through the pass of a current through the winding coil of a conductor. Currents inducted in the conducting matter in the core of the coil are ultimately causing the heating effect by Joule's effect.

In the first zone of the reactor, it is possible to achieve the heating effect (rotation of the two terminals) by means of the stimulation from the variable electric field which transforms molybdenite (MoS2) into the conducting substance, and in an immediate response the electromagnetic inducting field can provide sufficient energy to the two-terminal as to evaporate and then starts the oxidation process with gas oxygen.

Figure 3:
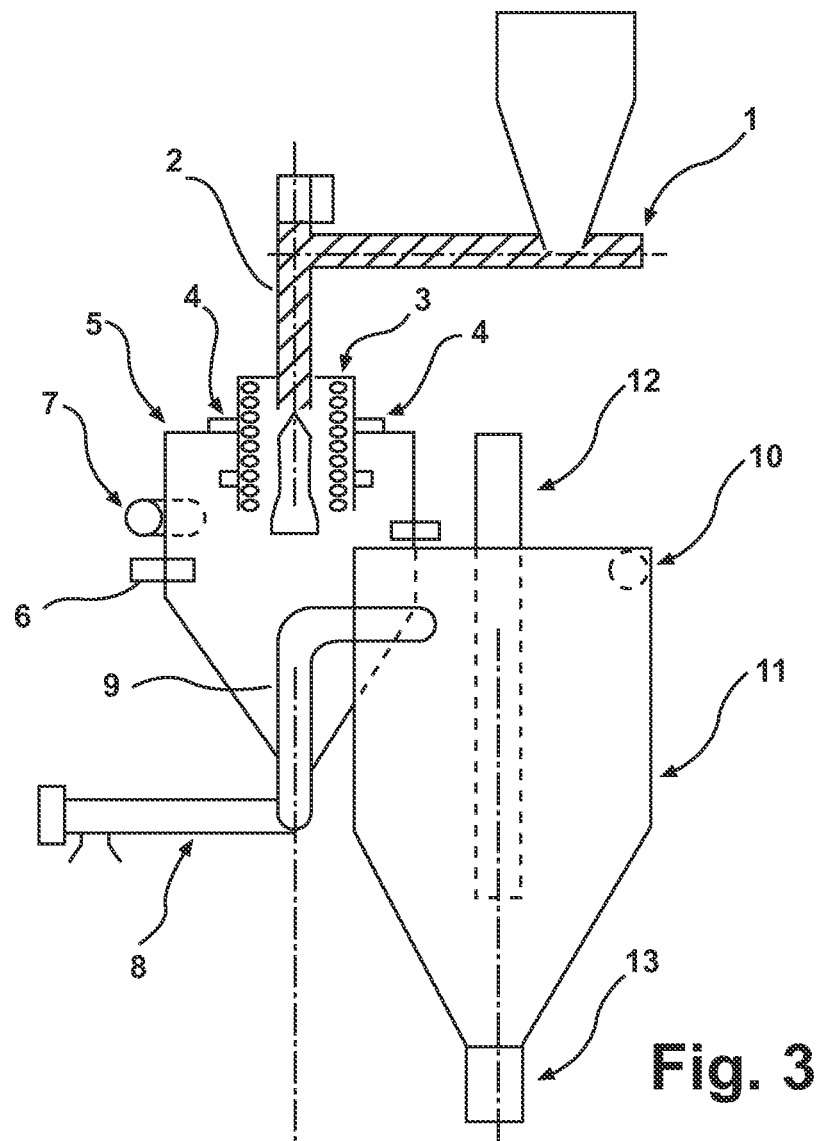
FIG. 3 shows a schematic lateral view of the reactor of the present invention.

FIG. 3 shows the preferred embodiment where the process of the present invention takes place, illustrating a reactor consisting of two complementing bodies therein.

It is characterized by the process being confined wherein loss of heat is low and heat reaction to oxidization after vaporization and the beginning of the oxidation process is either immediate or spontaneous.

Figure 4:
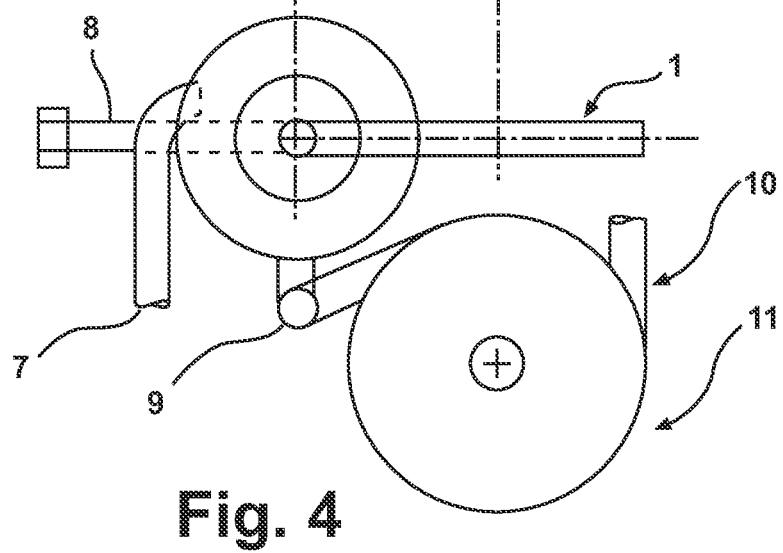
FIG. 4 shows a schematic plan view of the reactor of the present invention.

As shown in FIGS. 3 and 4, the reactor consists of one first body 5 and one second body 11, the material of the sheet of the external surface of each of the bodies is heat-resistant and in the internal part presents refractory lining which keeps the reaction chambers thermally insulated from the external environment.

Concentrate of molybdenum sulphide—with or without sulphur and oils—is fed from a feeding bin 1 discharging into a dispenser 2 which has a joint movement mechanism connected to the main axis and built from a material prone to magnetic induction, which enters the sulphide to the transformation area. In this area, where the first stage of the process takes place, molybdenum sulphide is ionized by the electric field generated by the first set of magnetrons 4 at a frequency in the range of 2500-3500 mega Hertz as to be heated by means of a variable magnetic field of 2500 Hertz produced by the winding coil 3, thus resulting in the exclusive evaporation of molybdenite. Impurities do not reach this gas state, preserving their solid state and continue moving down the roasting furnace. Molybdenum sulphide in gas state is then stimulated by means of a second set of magnetrons 6 and with the injection of air 7, either standard or oxygen-enriched; it is oxidized until trioxide is obtained with the release of heat thus reaching temperatures up to 850° C. Solid particles of gas non-productive impurities in the first body 5 are then removed and collected through an extraction screw 8.

Hot gas from the first body 5 are then transported to the second body 11 through a first duct 9; these gases mainly contain molybdenum trioxide, sulphur dioxide and nitrogen if the initial concentrate had contents of arsenic as an impurity, such impurity will then be in a gas state moving towards the second body 11 as arsenic trioxide. Cold air is then added into the second body 11 trough a second duct 10 for adiabatic cooling of the gas at temperatures below 600° C. This is essential in the process which takes place in this second body as to render molybdenum trioxide to crystals below its sublimation point.

In the second body 11 crystals formed by liquefaction settle and are removed through a lower duct 13. Gases at a temperature of 600° C. are conducted for cooling and cleaning through a duct 12 located at a higher point.

The present invention is also aimed to the process of obtaining molybdenum sulphide within an oxidizing reactor.

The global stages of the process are the following:

Sublimation of molybdenite which leverages the first property, variable magnetic and electric fields are used to heat and volatilize at low temperature by using the second property.

Conversion to molybdenum trioxide, molybdenum sulphide is spontaneously oxidized using a controlled flow of air or oxygen-enriched air under a high frequency electric field, based on the third property as to keep the trioxide in gas state and impurities as solids.

Separation of trioxide from molybdenum, the third property is still in use but through a decrease in temperature molybdenum trioxide condensation is reached as a solid in crystals.

In stage (A) of the process, molybdenum concentrate is subject to magnetic and electric fields in order to gain a controlled increase in temperature to a maximum of 350° C., as molybdenum sulphide at such temperature is in gas state and should there be any remaining amount of arsenic sulphide it will also be in gas state.

In stage (B), gas products resulting from the first stage are subject to an electric field in the presence of oxygen as to oxidize sulphides, thus producing molybdenum trioxide (MoO3), arsenious oxide (AS2O3), and sulphide dioxide (SO2). Temperature at this stage should be kept in a range of 800-850° C.

Process stages (A) and (B) take place in the first body 5 of the reactor shown in FIGS. 3 and 4.

Finally, in stage (C) the molybdenum trioxide is selectively separated by condensation thus slightly decreasing gas temperature by means of injection of fresh air, hence the rest of the components are kept in a gas state. Stage (C) of the process is carried out in the second body 11 of the reactor illustrated in FIGS. 3 and 4.

Below are the specific stages of the process:
(a) Feeding of molybdenum sulphide concentrate—with or without sulphur and oils—from a feeding bin 1 discharging into a dispenser 2 which has a joint movement mechanism connected to the main axis and built from a material prone to magnetic induction, which enters the sulphide to the transformation area.
(b) Ionization of molybdenum sulphide by the electric field generated by the first set of magnetrons 4 at a frequency in the range of 2500-3500 mega Hertz as to be heated by means of a variable magnetic field of 2500 Hertz produced by the winding coil 3, thus resulting in the exclusive evaporation of molybdenite.
(c) Force impurities which do not reach the gas state and are still solid to fall.
(d) Stimulation of molybdenum sulphide in gas state with a second set of magnetrons 6 and with air injection 7—either standard air or oxygen-enriched air—, thus oxidizing to trioxide with release of heat reaching a temperature up to 850° C.;
(e) Removing and collecting of solid particles of impurities which are not in gas state in the first body 5 through an extraction screw 8.
(f) Conduction of hot gases from the first body 5 to the second body 11 through a first duct 9; these gases mainly contain molybdenum trioxide, sulphur dioxide and nitrogen if the initial concentrate had contents of arsenic as an impurity, such impurity will then be in a gas state moving towards the second body 11 as arsenic trioxide.
(g) Injection of cold air in the second body 11 through a second duct 10 for adiabatic cooling of the gas at temperatures below 600° C. This is essential in the process which takes place in this second body as to render molybdenum trioxide to crystals below its sublimation point.
(h) Removal of crystals formed by liquefaction in the second body 11 through a lower duct 13.
(i) Conduction of gases at a temperature of 600° C. for cooling and cleaning purposes through a duct 12 located at a higher point.

What is claimed is:

1. An oxidizing reactor for molybdenum sulphide wherein said reactor consists of:
- a first body forming a reaction chamber and having an external surface made from a heat resistant material and an internal surface which is lined with a refractory lining;
- a feeding bin for feeding molybdenum sulphide concentrate to the first body;
- a dispenser between the feeding bin and the first body for receiving the molybdenum sulphide concentrate from the feeding bin and supplying the molybdenum sulphide concentrate to the first body;
- a first set of magnetrons for ionizing the molybdenum sulphide concentrate in the first body;
- a winding coil for generating a variable magnetic field for heating of the molybdenum sulphide concentrate in the first body and to exclusively evaporate the molybdenum sulphide concentrate;
- a second set of magnetrons and an air injector for oxidizing the evaporated molybdenum sulphide in the first body to form molybdenum trioxide with release of heat;
- an extraction screw for collection and removal of solid particles of impurities from the first body;
- a second body forming a reaction chamber having an external surface made from a heat resistant material and an internal surface which is lined with a refractory lining;
- a first duct for conducting hot gases from the first body towards the second body, wherein the hot gases essentially contain molybdenum trioxide, sulphur dioxide, and nitrogen;
- a second duct for adiabatic cooling of the hot gases and located in an upper portion of the second body so as to inject cold air to cool the molybdenum trioxide gas below its sublimation point and to render the molybdenum trioxide gas into crystals;
- a lower duct located in a lower part of the second body for removing the crystals; and
- a higher duct located in a higher part of the second body for removal of gases for cooling and cleaning purposes.

2. The reactor according to claim 1 wherein the dispenser comprises a feeding mechanism made of a material prone to magnetic induction.

3. The reactor according to claim 1 wherein the first set of magnetrons is adapted to generate an electric field at a frequency in the range of 2500-3500 mega Hertz.

4. The reactor according to claim 1 wherein the winding coil is adapted to generate a magnetic field of 2500 Hertz.

5. The reactor according to claim 1 wherein the second set of magnetrons and the air injector are adapted to stimulate the evaporated molybdenum sulphide to a temperature of 850° C.

6. The reactor according to claim 1 wherein the hot oases further contain arsenic trioxide.

7. The reactor according to claim 1 wherein the air injector is adapted to inject one of standard air and oxygen-enriched air.

* * * * *

UNITED STATES PATENT AND TRADEMARK OFFICE
CERTIFICATE OF CORRECTION

| | | Page 1 of 1 |
|---|---|---|
| PATENT NO. | : 7,901,638 B2 | |
| APPLICATION NO. | : 12/119752 | |
| DATED | : March 8, 2011 | |
| INVENTOR(S) | : Gustavo Cartagena | |

It is certified that error appears in the above-identified patent and that said Letters Patent is hereby corrected as shown below:

Col. 6, lines 24-25, Claim 6: "The reactor according to claim 1 wherein the hot oases further contain arsenic trioxide." - should be Claim 6: -- The reactor according to claim 1 wherein the hot gases further contain arsenic trioxide. --

Signed and Sealed this
Third Day of May, 2011

David J. Kappos
*Director of the United States Patent and Trademark Office*